United States Patent [19]
Fuller

[11] Patent Number: 5,754,844
[45] Date of Patent: May 19, 1998

[54] METHOD AND SYSTEM FOR ACCESSING CHUNKS OF DATA USING MATCHING OF AN ACCESS TAB AND HASHING CODE TO GENERATE A SUGGESTED STORAGE LOCATION

[75] Inventor: Billy J. Fuller, Colorado Springs, Colo.

[73] Assignee: Sun Microsystems, Inc., Mountain View, Calif.

[21] Appl. No.: 572,512

[22] Filed: Dec. 14, 1995

[51] Int. Cl.$^6$ .................................................. G06F 1/00
[52] U.S. Cl. .......................... 395/606; 395/612; 395/605; 364/251.6
[58] Field of Search .................. 340/172.5; 364/521; 395/600, 700, 425, 50, 672, 569, 825, 601, 182.21, 461, 200.2, 706, 441, 603, 800, 615

[56] References Cited

U.S. PATENT DOCUMENTS

| | | | |
|---|---|---|---|
| 3,668,647 | 6/1972 | Evangelisti et al. | 340/172.5 |
| 4,761,737 | 8/1988 | Duvall et al. | 364/300 |
| 4,794,528 | 12/1988 | Hirose et al. | 395/606 |
| 4,831,582 | 5/1989 | Miller et al. | 395/615 |
| 4,853,878 | 8/1989 | Brown | 364/521 |
| 5,129,088 | 7/1992 | Auslander et al. | 395/700 |
| 5,201,046 | 4/1993 | Goldberg et al. | 395/611 |
| 5,218,696 | 6/1993 | Baird et al. | 395/600 |
| 5,333,315 | 7/1994 | Saether et al. | 395/600 |
| 5,371,885 | 12/1994 | Letwin | 395/600 |
| 5,390,318 | 2/1995 | Ramakrishnan et al. | 395/425 |
| 5,442,797 | 8/1995 | Casavant et al. | 395/706 |
| 5,465,365 | 11/1995 | Winterbottom | 395/600 |
| 5,566,332 | 10/1996 | Adair et al. | 395/612 |
| 5,592,648 | 1/1997 | Schultz et al. | 395/441 |

*Primary Examiner*—Thomas G. Black
*Assistant Examiner*—Charles Rones
*Attorney, Agent, or Firm*—William J. Kubida; Homer L. Knearl; Holland & Hart LLP

[57] ABSTRACT

In the tagged, hashed file system, each finite portion of a file of the user's data is tagged with a pathname (filename and path) and a logical offset of the data within the file. A hint, as to where the portion is located in storage in the THFS, is computed by hashing the pathname and the logical offset. Once the hint is provided, then the THFS commences to search storage from the location suggested by the hint until it finds a match between the tag on the portion with the pathname and logical offset. When a portion is to be written, the intended location for placement of the portion must be read to ensure that it is available for writing, i.e. empty. If the location is not available, then a search must be made for the closest available (empty) location, and the user data is written there. If during a read operation a matched tag is not found until an empty area is read, the search will terminate, and the user application will be notified that no file was found.

13 Claims, 7 Drawing Sheets

METHOD AND SYSTEM FOR ACCESSING CHUNKS OF DATA USING MATCHING OF AN ACCESS TAB AND HASHING CODE TO GENERATE A SUGGESTED STORAGE LOCATION

BACKGROUND OF THE INVENTION

1. Field of the Invention

The present invention relates to file systems for computers, and more particularly relates to a file system which employs no inter-related metadata.

2. Description of Related Art

Modern file systems have an accepted problem that limits their performance, reliability, availability, and flexibility. The problem is that the file system's metadata is composed of inter-related structures on the physical media. Modern file systems use this metadata to organize the user data and to keep track of resources within the file system.

This inter-related metadata can become out-of-sync with itself because of system failures or software "bugs". The out-of-sync metadata can lead to data corruption and system failures. The task of keeping the metadata in sync with itself is complex and limits the performance, reliability, availability, and flexibility of modern file systems.

There have been a number of books and treatises written on operating systems such as the UNIX®[1] operating system. These include excellent summaries of the file systems employed by the operating system. For example, see "The Design and Implementation of the 4.3BSD UNIX® Operating System" by Leffler, McKusick, Karels and Quarterman.

It is a study in and of itself to understand the complexity and the amount of internal "bookkeeping" which is required to properly update, create and maintain a file system for a complex operating system. By way of example only, the UNIX® file system is summarily described below with reference to FIGS. 1A & 1B of the drawings.

In the UNIX® file system, the internal representation of a file is given by an "inode" which contains a description of the disk layout of the file data and other information such as the file owner, access permissions, and access times. The term inode is a contraction of the term "index node" and is commonly used in literature on the UNIX® system. Every file has one inode, but it may have several "names", all of which map into the inode. Each name is called a "link".

A computer process during the execution of a program requires the interpretation of a pattern of bytes that the CPU interprets as machine instructions (called "text"), data, and stack. Many processes appear to execute simultaneously as the kernel schedules them for execution, and several processes may be instances of one program. When a "process" refers to a file by name (including its'path, sometimes referred to as a pathname), the kernel parses the file name one character at a time, checks that the process has permission to search the directories in the path, and eventually retrieves the inode for the file. For example, if a process calls open "/fs4/bjf/sun/sourcefile", the kernel retrieves the inode for "/fs4/bjf/sun/sourcefile". When a process creates a new file, the kernel assigns the file an unused inode. Inodes are stored in the file system, but the kernel, when manipulating files, reads them into an inode table contained in memory.

Figure 1A:
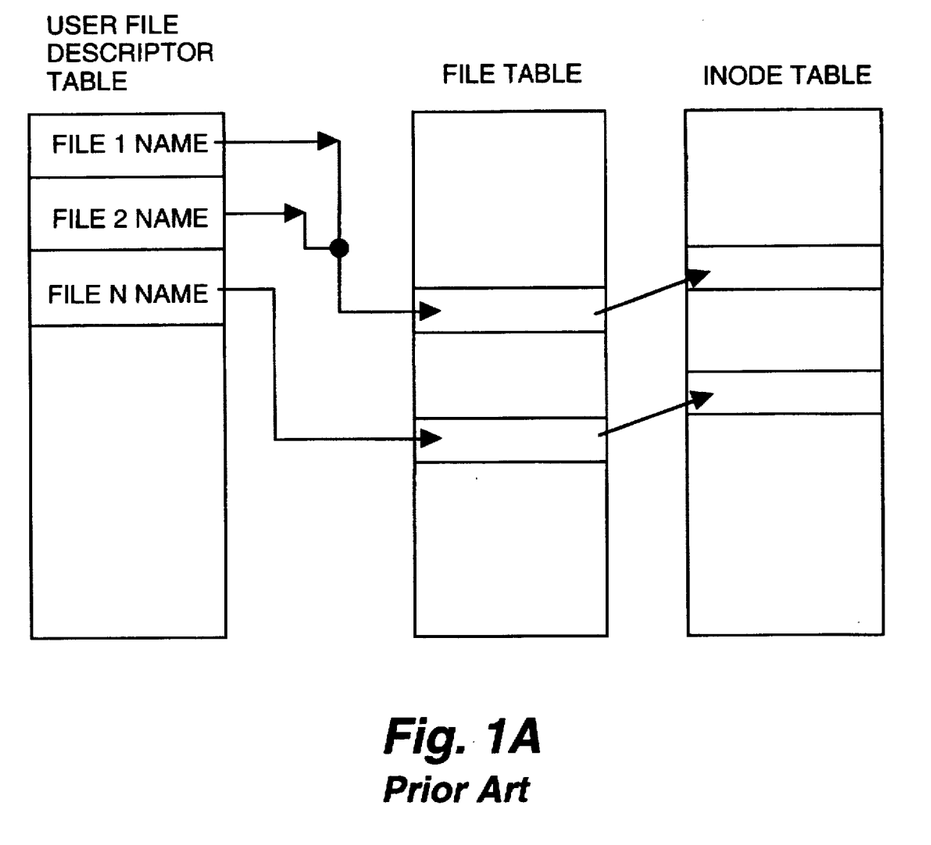
FIG. 1A is a schematic & abbreviated representation of the file descriptors, file table and inode table of a portion of the UNIX operating system's file system.

As illustrated in FIG. 1A, the kernel contains two other data structures, the "file table" and the "user file descriptor table". The file table is a kernel structure, which keeps track of (1) the byte offset in the file where the user's next read or write will start and (2) the access rights allowed to the opening process. The user file descriptor table is allocated for every process, and it identifies all open files for a process. When a process opens or creates a file, the kernel allocates an entry from each table, corresponding to the file's inode. Entries in the three structures, i.e. user file descriptor table, file table, and inode table, maintain the state of the file and the user's access to it. The kernel returns a file descriptor for the open and read system calls, which is an index into the user file descriptor table. When executing read and write system calls, the kernel uses the file descriptor to access the user file descriptor table, follows pointers to the file table and inode table entries, and, from the inode, finds the data in the file. For now, suffice it to say that use of the three tables briefly described above allows diverse degrees of sharing access to a file.

Figure 1B:
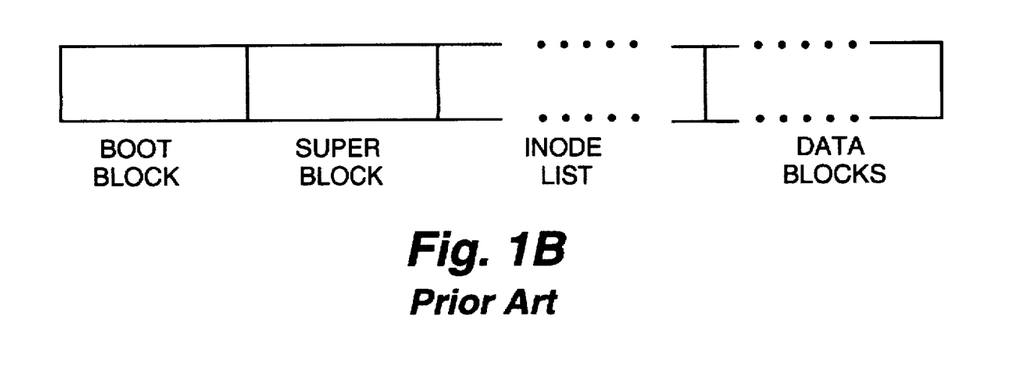
FIG. 1B is a schematic & abbreviated representation of the file system layout of the UNIX® operating system's file system.

The UNIX® file system has the structure depicted in FIG. 1B, and briefly described below. Referring now to FIG. 1B, the "boot block" occupies the beginning of a file system, typically the first sector, and as is conventional, may contain the "bootstrap" code that is read into the machine to initialize the operating system. Although only one boot block is needed to boot the system, every file system has a (possibly empty) boot block.

The "super block" describes the state of a file system, the size of the file system, the number of free blocks in the file system, a list of free blocks available on the file system, the index of the next free block in a list of free blocks, the size of the inode list, the number of free inodes in the file system, a list of free inodes in the file system, the index of the next free inode in the free inode list, lock fields for the free block and free inode lists, and a flag indicating that the super block has been modified.

The "inode list" is a list of inodes that follows the super block in the file system. Conventionally, administrators specify the size of the inode list when configuring a file system. The kernel references inodes by index into the inode list. One inode is the "root inode" of the file system: it is the inode by which the directory structure of the file system is accessible after execution of the "mount" system call.

The "data blocks" start at the end of the inode list and contain file data and administrative data. An allocated data block can belong to one and only one file in the file system.

Moreover, there are numerous other parts of the typical UNIX® file system which complicate and make burdensome the file structure, integrity and other aspects of record keeping for the file system. For example, directories are the files that give the file system its hierarchical structure. In the instance of a UNIX® operating system, directories are important in converting a file name to an inode number.

SUMMARY OF THE INVENTION

In accordance with this invention, the above problems have been solved by accessing a "chunk" in a storage medium by hashing an access tag. A chunk is a predetermined number of bytes or blocks. A chunk may be any size, but in a given file system, all chunks are the same size. The chunk is divided into two portions, tag and data. The data is data usually for part of a file, but a small file might be small enough to be contained in one chunk. When the chunk is stored in a storage medium, the tag is referred to as a storage tag. The storage tag is made up of a pathname, filename and path to a file, and a logical offset, the number of bytes or blocks from beginning of file to the chunk.

In operation, an access tag is received from a user requesting access to a "chunk" in a storage medium. The access tag is identical to the storage tag of the chunk being requested by a user. The pathname and the logical offset in the access tag is hashed to generate a suggested location for the storage of the chunk in the storage medium. The storage medium is searched from the suggested location to locations proximate to the suggested location to look for a match between the storage tag and the access tag to locate the chunk requested by the user.

As a further feature of the invention, the searching operation is accomplished by reading the storage tag of the chunk at the suggested location, comparing each storage tag read by said reading step with the access tag and indicating a tag match if the storage tag matches the access tag, detecting an available-for-write chunk if said comparing step has not indicated a tag match and the chunk is empty, and scanning in a preset search pattern from the suggested location to a new storage location to read the storage tag of a new chunk. The steps of comparing, detecting and scanning are repeated until a tag match or an available-for-write chunk is detected.

In accordance with the file system of the present invention, the file is initially written to a location computed by hashing the pathname and the logical offset. The placement of the data is always read first to ensure that there isn't a conflicting chunk, i.e. one that has been previously written, in the place where the data is to be written. When locating the data for reading, modifying, or updating it, the pathname and the logical offset must be hashed with the same hashing operation employed for writing the file. The hashing operation generates a hint for the file location. Once the hint is provided, the Tagged Hashed File System (THFS) searches the disk (or if in cache memory) from that point on until it finds a match in the tag with the pathname and logical offset.

The THFS has many useful characteristics in its availability, reliability and flexibility. It is more available than other file Systems because a Tagged, Hashed File System is designed to avoid being in an inconsistent state. The THFS can be accessed immediately without a lengthy check-and-repair cycle. Moreover, the THFS is kept in a consistent state without complex logging or journaling technology. The THFS of the present invention is more reliable because the "good" portions of the user's data can be easily recovered even in the event of partial media failure or partial file system corruption. The THFS is much more flexible because it is only loosely tied to the physical media. Upstream and downstream caching at the block level is easily implemented. There is no requirement that the system search on only one piece of media for the pathname and offset found in the tag. For example, the system may easily check local disk(s), server's disk(s), the Hierarchial Storage Subsystem, and/or the Backup Subsystem. Additionally, the system could easily cache desired blocks of a file with a particular pathname wherever it wanted.

A great advantage of the THFS of the present invention is that since there is no metadata, no journal is required thereby eliminating the complexities of a journaling type file system. Additionally, while conserving disk space, which makes the file system of the present invention more useful, implementation is fast and easy.

Another major advantage of the THFS is that it easily survives media corruption without "hanging" in the file system i.e., for example, there could be disk damage, and only thing that would be hurt or possibly lost is where the damage had occurred. Thus the THFS of the present invention does not have to rely upon inter-related metadata to insure either writes or reads.

Another very distinct advantage is that with very large systems, e.g. 200 GByte systems, where system boot may take 2+ hours, a system boot with the file system of present invention takes very little time, i.e. less than 5 minutes.

In all these ways, the THFS of the present invention is useful as a replacement for the more complex, metadata bound or constrained file system.

A more complete understanding of the invention may be had by referring to the following description taken in conjunction with the accompanying drawings in which:

DETAILED DESCRIPTION OF PREFERRED EMBODIMENTS

In accordance with a preferred embodiment of the invention, the tagged, hashed file system (THFS) writes and reads user data in "chunks," each chunk contains user data and a tag. The size of a chunk is a preset number of bytes or blocks. All chunks in the THFS are the same size. The tag identifies the chunk. The same tag is hashed to identify the location of storage space in storage media for the chunk. The media may be either non-volatile storage or volatile memory (as the case may be). When accessing such data, a hashing operation hashes the tag to "hint" or suggest the location of the chunk to be written/read. The chunk is located (if previously written) by looking at the suggested location for the tag of the chunk. The tag is a name (hereinafter referred to as pathname, because it includes the filename and the path for finding the file as part of the name) plus an offset in bytes or blocks from the beginning of file.

Figure 2A:
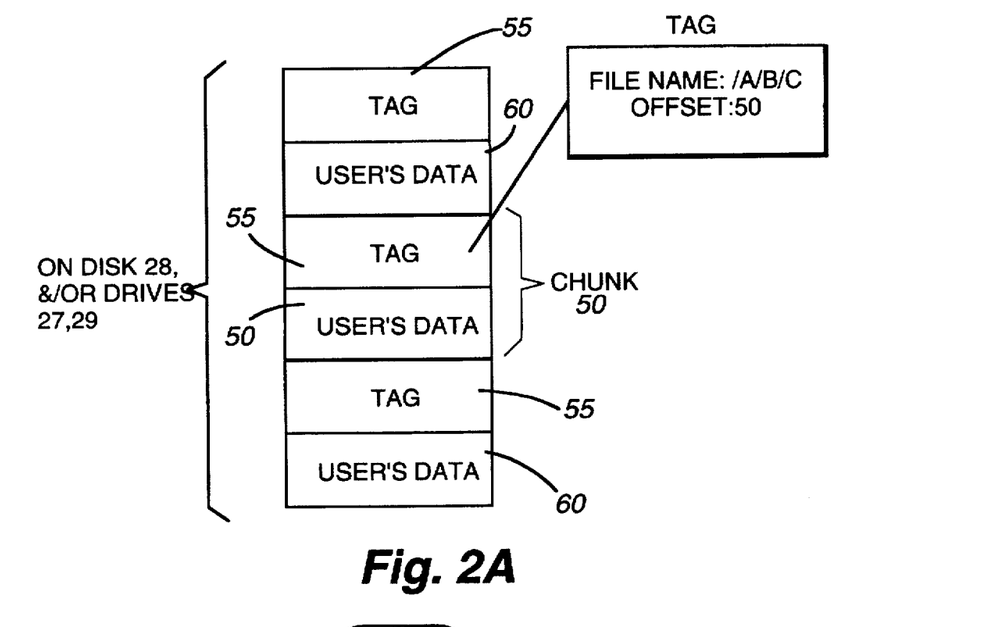
FIG. 2A is a schematic representation of a group of chunks, and in which each chunk has a tag or header, and user's data.

Referring to FIG. 2A, a user's file is broken up into chunks 50, each chunk 50 has a tag portion 55 and a user's data portion 60. For our examples, assume a chunk size of 1024 bytes. The tag 55 contains two items of information: (1) the pathname (filename +full path information including subdirectories etc.) and (2) the offset in blocks or bytes that the chunk is located from the beginning of the file. (NOTE: A block may be any convenient size, usually in most systems, e.g. UNIX®, DOS, OS/2® etc., some multiple of 512 bytes, e.g. 1024 . . . . 4096 etc.) For example, suppose the pathname was "/a/b/c", and the data chunk desired by the particular application program was fifty (50) blocks from the beginning of file. Then the tag 55 is "/a/b/c, 50". The file offset could also be set forth in terms of "bytes" offset from the start of the file. This is the more typical or conventional way of data-within-a-file designation, depending upon the operating system or application program protocol. The byte offset, in this example, would be 51,200 bytes (50 times 1024).

Figure 2B:
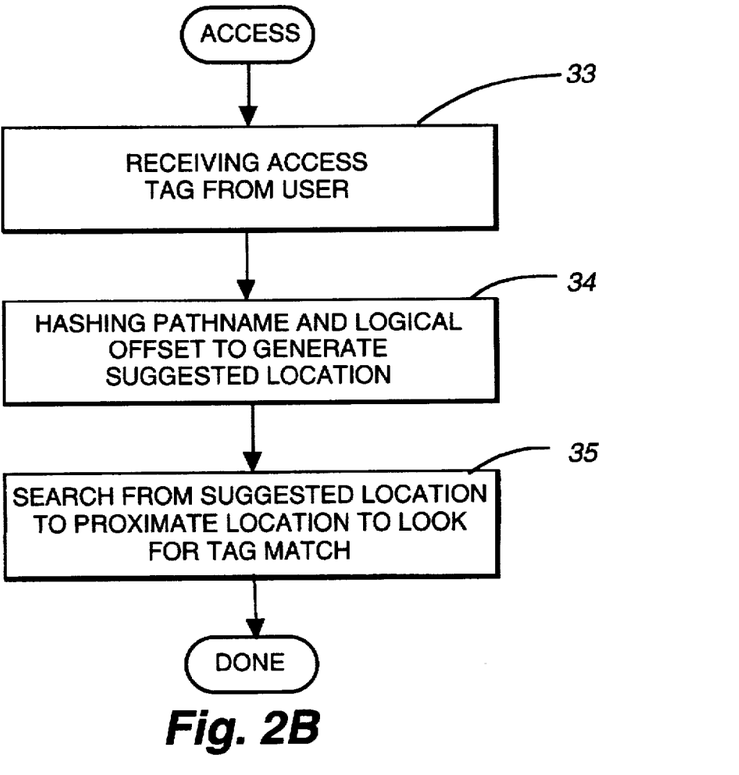
FIG. 2B illustrates the primary logical operations of a preferred embodiment of the invention.

With the above file system and chunk storage structure in mind, the primary logical operations for accessing a chunk of a file in accordance with a preferred embodiment of the invention are shown in FIG. 2B. The access operation begins at logical operation 33 which receives an access tag in an access (read/write) request message from the user. The access tag is identical to the storage tag on the chunk in the storage medium, i.e. the chunk the user is requesting access to. Operation 34 then hashes the access tag to generate a suggested location in the storage medium where the chunk can be found. Any number of hashing operations may be selected to perform operation 34. (One embodiment for the hashing operation is described hereinafter with reference to FIG. 4.) The search operation 35 searches in a search pattern from the suggested location for the chunk to other storage locations for chunks proximate to the suggested location. The search operation is looking for a tag match, i.e. a match between the access tag in the access request and the storage tag in a chunk at a storage location in the storage medium.

Figure 2C:
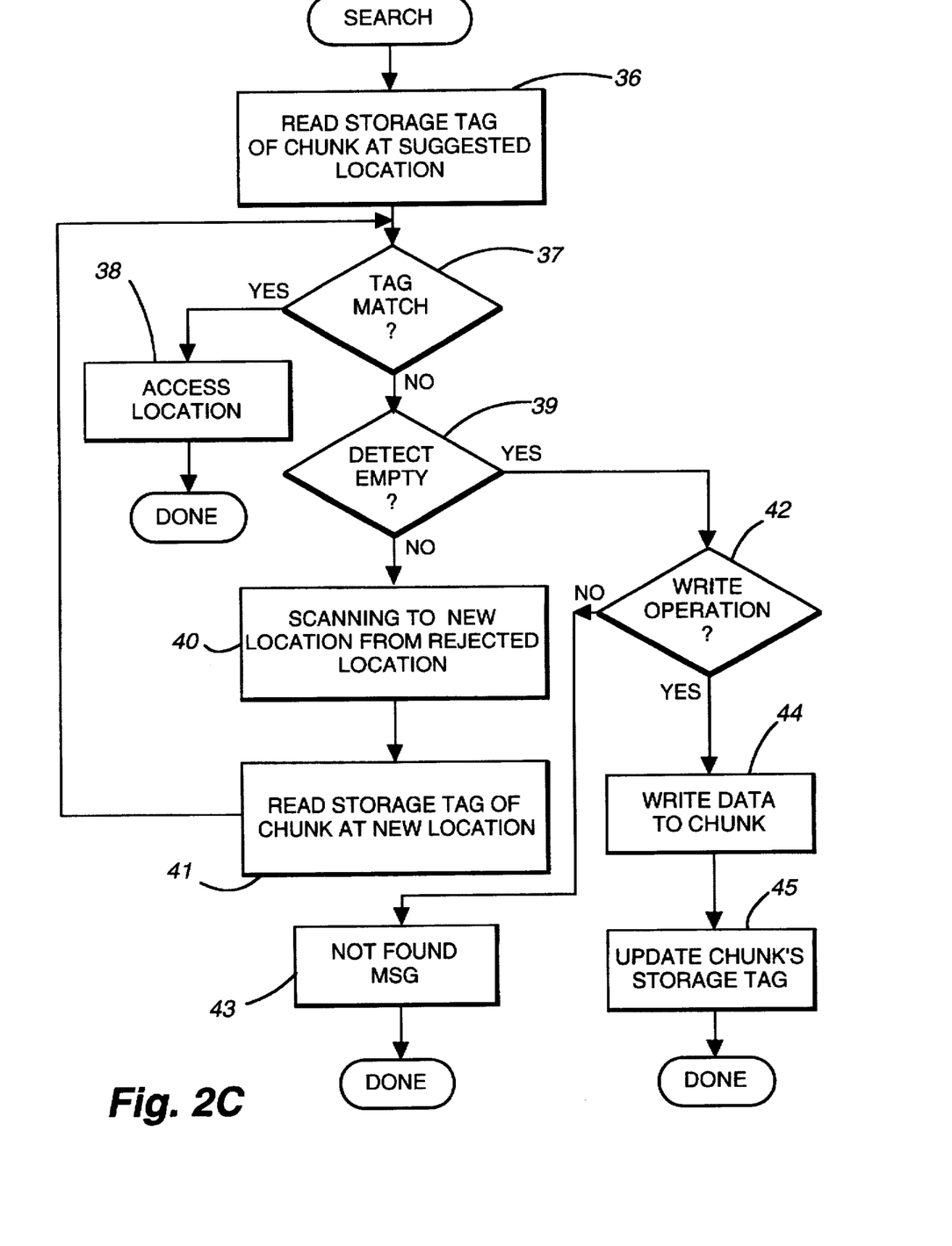
FIG. 2C illustrates the search operation included in FIG. 2B.

FIG. 2C illustrates the logical operations that make up search operation 35 in FIG. 2B. The search operation begins at step 36 which reads the storage tag of the chunk at the suggested location received from the hashing operation 34 (FIG. 2B). Decision operation 37 compares the access tag to the storage tag. If there is a match, the search operation branches "Yes" to operation 38. Access location operation 38 reads or writes the chunk at the storage location found by the tag match.

If there is no tag match, the search operation branches "No" to decision operation 39. Decision operation tests the user data space 60 (FIG. 2A) in the chunk to see if the chunk is empty. If the chunk is empty, the chunk is available for writing. If the chunk is not empty, decision operation branches "No" to scanning operation 40. Scanning operation 40 then scans the storage medium in a preset pattern to move the read/write transducer of the storage medium to a new location. This new location will be chosen by the preset pattern to be proximate to the location just read and rejected through operations 37 and 39. The best choice for the scan pattern and the physical proximity of the new location to the rejected location depends on the efficiencies of the scanning mechanism. Proximity in time of access may be more relevant to the choice than proximity in physical space on the storage medium. At the new location, operation 41 reads the storage tag of the chunk, and the storage operation loops back to decision operation 37 to compare for a tag match.

If there is no tag match decision operation 39, detects whether the chunk is empty as described above. If the chunk is empty, the search operation branches "Yes" to decision operation 42. Decision operation 42 detects whether the access request is a write operation. If the access operation is a read operation, the search operation branches "No" to operation 43. Operation 43 sends an error message back to processor/user that the chunk is "Not found." If the access operation is a write operation, the process branches "Yes" from decision operation 42 to operation 44.

Operation 44 writes data from the user application to the chunk in the storage medium. Then update operation 45 changes the storage tag at the chunk just written to the access tag in the access (write) request. Thereafter, the newly written chunk can be accessed using the access tag.

In summary, the search operation starts at the suggested location. If it does not find a tag match or an empty chunk at the suggested location, it scans in a preset pattern to new locations until it does find a tag match or an empty chunk. If the search finds a tag match, it accesses the chunk. If the search finds an empty chunk and the access is a read request, the search returns a "not found" message. If the search finds an empty chunk and the access is a write request, the write data is written to the empty chunk and the storage tag of the newly written chunk is updated to match the access tag.

The operating environment in which the present invention is used encompasses a general distributed computing system, wherein general purpose computers, workstations, or personal computers are connected via communication links of various types, in a client-server arrangement. This is done so that programs, data and the like, many in the form of objects, may be made available by and to various users on the system.

Figure 3:
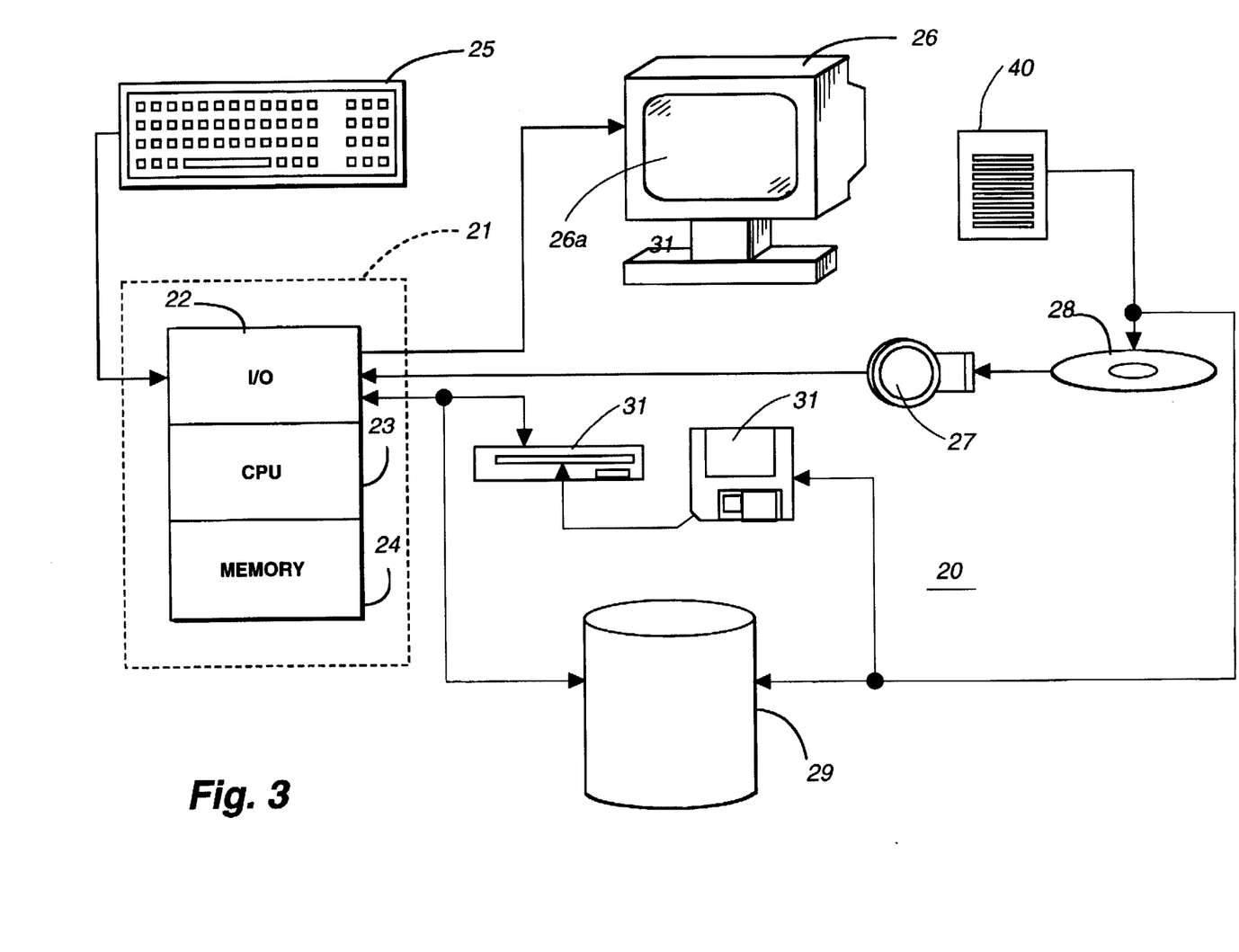
FIG. 3 is a data processing system which provides the operative elements to perform the logical operations of the invention.

Some of the elements of a data processing general purpose workstation computer 20 are illustrated in FIG. 3, wherein a processor 21 is shown, having an input/output (I/O) section 22, a central processing unit (CPU) 23 and a memory section 24. The I/O section 22 is connected, inter alia, to a keyboard 25, a display or monitor 26, and non-volatile memory. The non-volatile memory may include a disk storage unit 29 (e.g. a hard drive), a CD-ROM or optical disk drive unit 27 and in the illustrated instance a floppy disk drive 30. (As is conventional, the drive controllers may be contained in the processor 21 or in the drives themselves). The CD-ROM unit 27 can read/write a CD-ROM medium 28 which typically contains programs and data, while the floppy disk drive 30 can read and write floppy disks 31. The computer program products which may be employed for carrying out the methods and apparatus of the present invention, may reside in the memory section 24, on disk storage unit 29, on the CD-ROM 28 or floppy disk 31 of such a system. Examples of such systems include SPARC systems offered by Sun MICROSYSTEMS, Inc., personal computers offered by IBM Corporation and by other manufacturers of IBM-compatible personal computers, and systems running the UNIX® or other operating system.

Figure 5:
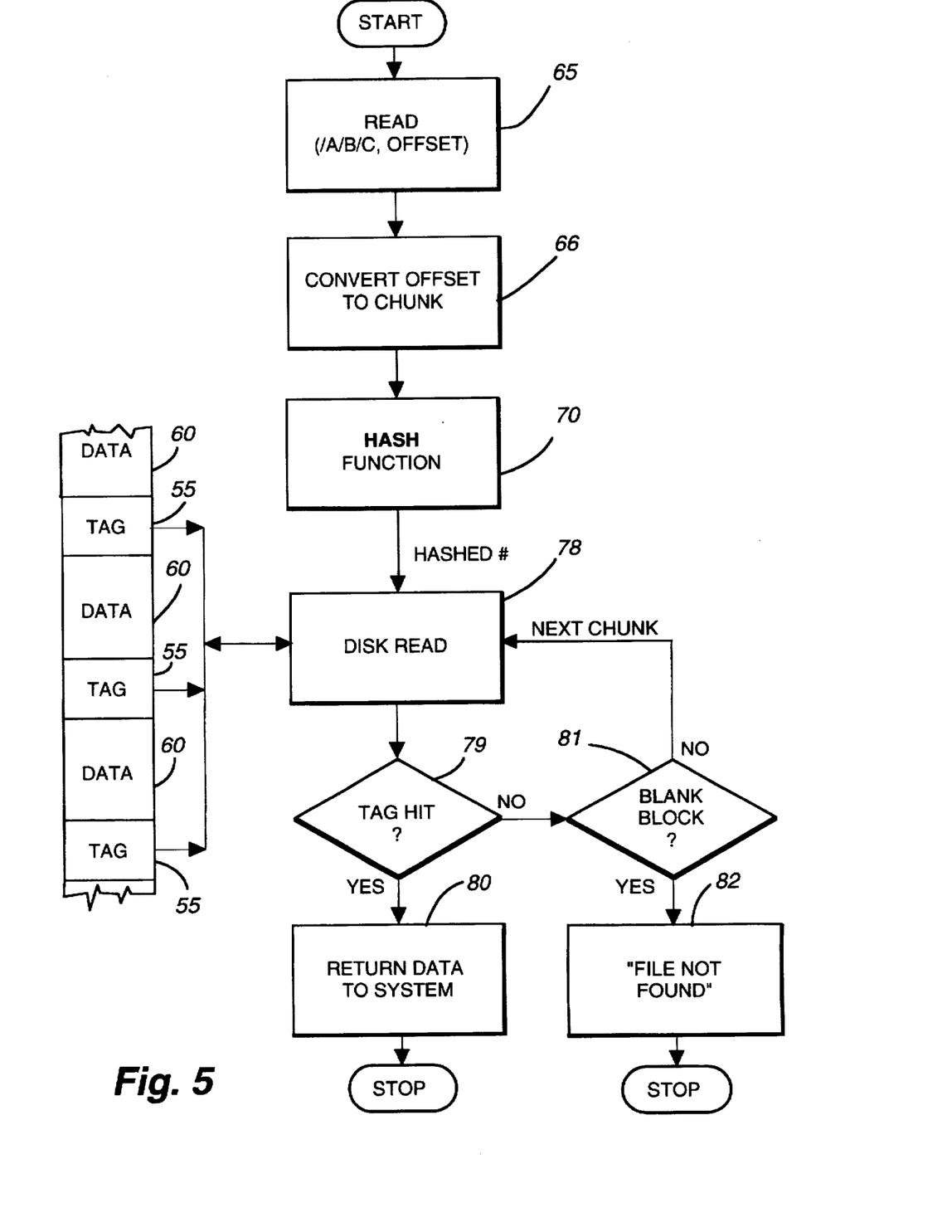
FIG. 5 is a flow chart exemplifying the read process of the tagged, hashed file system.

In another embodiment of the invention in FIG. 5, assume that the data for the file with the pathname "/a/b/c" was already on disk and the operator-user desires to get the data for modification, addition, etc. the process outlined in FIG. 5 is followed. Assume that the data processing system 20 of FIG. 3 has been initialized and is up and running. At the outset, the operator/user of the data processing system illustrated in FIG. 3, and described heretofore, will call up an application program (e.g. a word processing program), as by the keyboard 25 via the computer 21, from the hard disk 29 or the CD-ROM drive 27 and CD-ROM 28, or even the floppy disk 31. Then assume the operator calls up a file with the pathname "/a/b/c," and the application program is programmed to give the offset at the end of the user's file which for example purposes is in block 50. When the operator/user calls up the file with the pathname "/a/b/c", the pathname is placed on the screen 26a of the monitor 26 by the system, and as is conventional, the operating system reads into memory 24 the file with the pathname "/a/b/c". This is accomplished, as shown in FIG. 5, by first reading at process step 65, the pathname and offset (/a/ b/c, 51,200). By a simple calculation, as in process step 66, the offset 51,200 is converted to a chunk number, in the illustrated instance, 51,200/1024=50.

The pathname and offset are utilized in a hashing operation to give to the file system a convenient starting place (a "hint" or suggestion) to look for a chunk with tag containing the desired pathname and offset. This hashing function takes place at process step 70 in FIG. 5. To this end, the hashing operation may be of any convenient type, e.g. a quadratic type, or a simple type, depending only upon the user's wishes and how well it works from a time-to-access the file basis.

Figure 4:
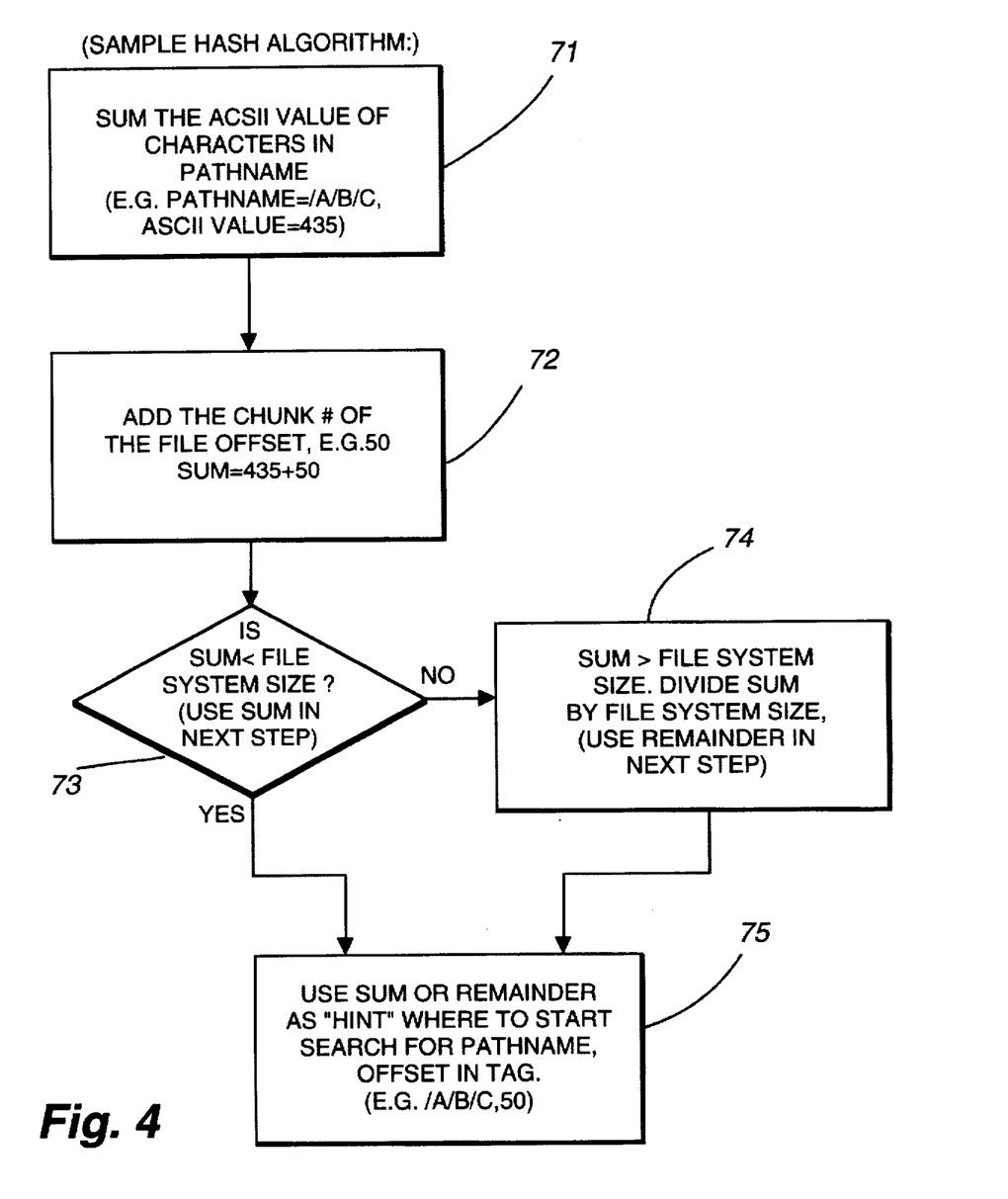
FIG. 4 is a flow chart demonstrating an example hashing operation to aid in file location/placement in accordance with the present invention.

Turning now to FIG. 4, a simple hashing operation is illustrated. However, it should be understood that the hashing operation may be of any convenient type which should allow for rapid access to the desired chunk containing the user data block of the sought-for file. For chunk 50 of a file with a pathname /a/b/c, operation 71 sums the ASCII value of the characters in the file's pathname. In the example pathname, "/a/b/c", the ASCII values are: /=47, a=97, b=98, c=99. Therefor, 3 times 47=141, and 141+97+98+99=435. Operation 72 then adds the chunk number of the file offset 50 to the sum from operation 71, e.g. 435+50. Decision operation 73 tests whether the sum, 485, from operation 72 is less than the file system size. If the file system size is 1024 blocks, the hashing operation branches "Yes" from decision operation 73 to operation 75. Operation 75 uses sum 485 as a "hint" or a suggestion as to where to start looking for the file with the pathname "/a/b/c" and an offset of chunk 50.

If the sum is greater in size than the size of the file system, hash operation branches "No" from operation 73 to operation 74. Division operation 74 divides the sum from operation 72 by the file system size and use the remainder as a "hint" or suggestion as to where to start looking for the file with the pathname "/a/b/c" and an offset of chunk 50. Operation 75 would then send the remainder onto the search operation as the suggested location for the chunk.

As an example of the above situation set forth in the last hashed process step, assume the pathname is "/sun/bjf/fuller" and the offset is still 50. The sum of the ASCII code for this pathname is 1337. (/=47, s=115, u=117, n=110, b=98, j=106, f=102, l=108, e=101, r=114). Summing the ASCII code for that pathname and offset or chunk number (1337+50)=1387, and dividing that number by 1024 equals 1 plus a remainder of 363. Therefore, the "hint" or suggestion is to "start looking at chunk 363".

After the Hash Function gives a "hint" as to where the file is located, the disk controller causes the head of the disk drive to seek the suggested location of the chunk on the disk, and as shown at process step 78, the disk (or if in memory, the memory) is read, using the hint as a suggested starting point. A search routine in the file system insures that the disk is searched in a predetermined pattern. The search pattern is the same for which the pattern was employed for finding a blank or unused block for a write is found. The search can be circular, (i.e. after the "hint" block tag is read, then the first block below the "hint" block and then the first block above the "hint" block, and then the second block above then the second below and so on) or it can be in consecutive chunk order or any other predetermined and consistent pattern until one of two situations occurs, either a tag is read matching the pathname and offset or a predetermined event occurs which signals to stop the search. Such an event can be the reading of a location and chunk with either a blank block or unused tag. A blank block or a block with an unused tag is a block which is available for writing. As shown, if a "hit" or tag match occurs, the data is returned to the system, as in step 80. In the loop of "No" hit, is a decision step 81 which determines if a blank block is read, or a tag of a block is read having no pathname and offset. If that occurs the search is terminated, and a message indicating such, is returned to the operator-user's screen 26a, e.g. at step 82, that "the file was not found".

Figure 6:
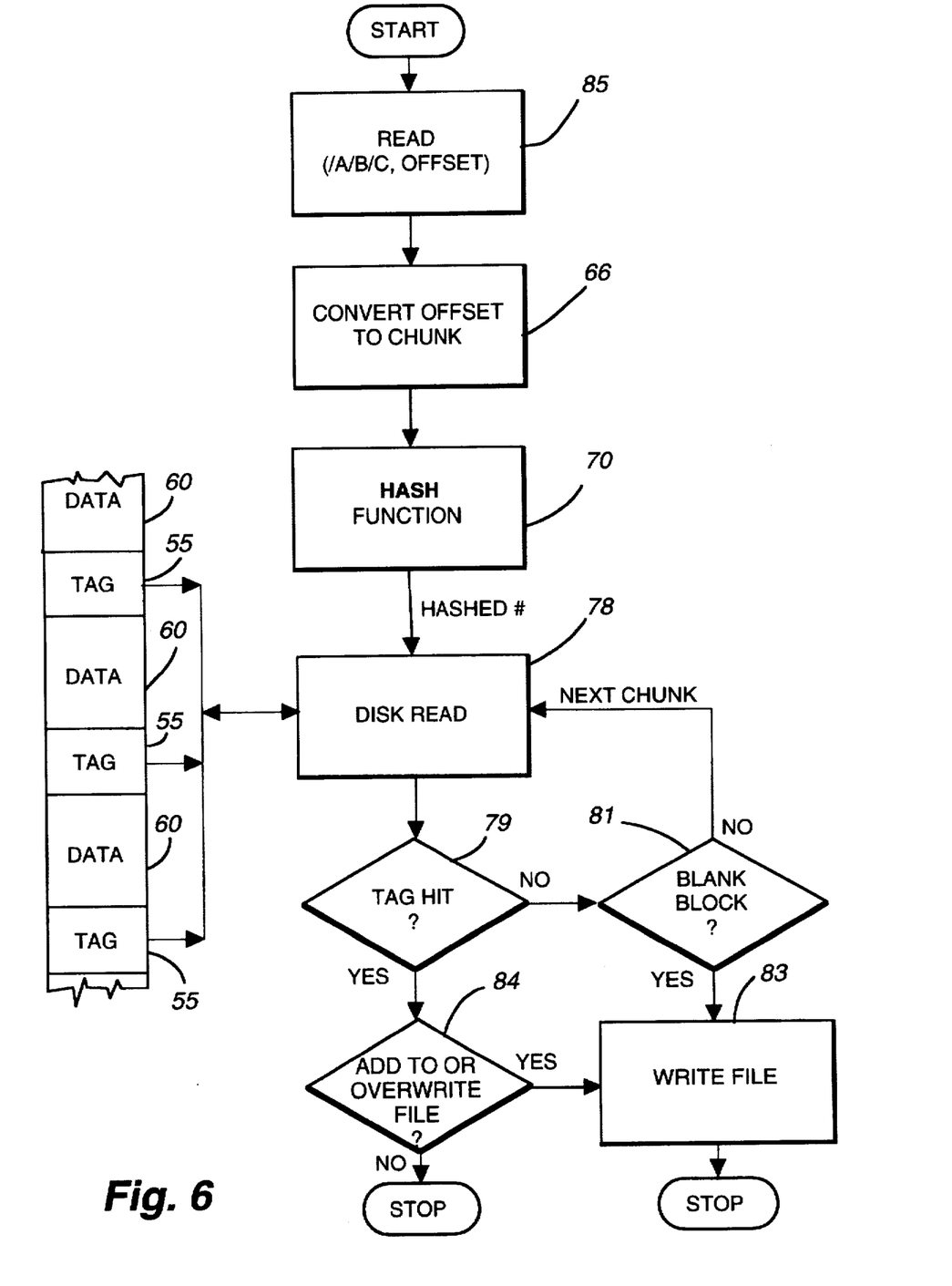
FIG. 6 is a flow chart illustrating the write process of the tagged, hashed file system.

When a file is to be put to disk, e.g. the disk drive 29 or on the disk 28 associated with the CD-ROM drive 27, the logical operations of FIG. 6 are followed. Assume that the same word processor application is active (running on the data processing system 20), and the operator-user decides to save a new file "/a/b/c", with the end of file being at offset 50. When he enters the command "save" the write process commences as at process step 85. If the offset is given as bytes, the same conversion occurs as in FIG. 5 in process step 66, and as discussed above. The hash function step 70 then is commenced and the same operation heretofore described and set forth above with reference to FIG. 4 is employed to give a "hint" as to the proper location for read/write.

Because there is no related metadata to indicate that the file is or is not already in existence, the first function is to check if such a file already exists. Thus a read function occurs and loops to check whether or not a block exists with the tag containing the pathname and offset of the file. As long as the search for a file with a tag having the same pathname and offset occurs in the same pattern as set forth above and described relative to FIG. 5, the search continues until the file is found or an "empty" block (a block free for being written to, in this context, is considered an empty block) is found. If an empty block is found, then the file is not present and a write will occur as shown by the decision step 81 and the process step 83. The tag of the written block will contain the filename and the offset. In the event that a file is found with the same filename and offset (decision step 79 returns "Yes"), then a message may be returned to the operator user on screen 26a of the monitor 26, for example, as shown in process step 84, "ADD TO OR OVERWRITE FILE?" The operator-user can then make a determination to overwrite the existing file or stop, and command a "save" for a new or different file name etc.

The THFS of the present invention is much more flexible because it is only loosely tied to the physical media. Upstream and downstream caching at the block level is easily implemented. In the previous example, there is no requirement that the system search on only 1 piece of media for block 50 of file "/a/b/c" or "/sun/bjf/fuller". For example, the system may easily check local disk(s) (such as multiple floppy disks 31), or CD-ROM disks 28, server's disk(s), a hierarchial storage subsystem, and/or a backup subsystem. Additionally, the system could easily cache blocks of a file wherever desired.

The THFS of the present invention is more available than other file Systems because a Tagged, Hashed File System is never in an inconsistent state. The simple but elegant file system of the present invention can be accessed immediately without a lengthy check-and-repair cycle. Moreover, the THFS heretofore described is kept in a consistent state without complex logging or journaling technology.

In addition, the THFS of the present invention is more reliable because the "good" portions of the user's data can be easily recovered even in the event of partial media failure or partial file system corruption.

Although the invention has been described with a certain degree of particularity, it should be recognized that elements thereof may be altered by person(s) skilled in the art with out departing from the spirit and scope of the invention as hereinafter set forth in the following claims.

What is claimed is:

1. A method of accessing chunks of data in files from a storage medium in a computer system, the storage medium for storing user data from a file in one or more chunks of date, each chunk having a storage tag portion and a user data portion, the storage tag having at least a pathname and a logical offset, said method comprising the steps of;

receiving an access tag from a user requesting access to the chunk, said access tag being identical to the storage tag of the chunk;

hashing the pathname and the logical offset in the access tag to generate a suggested location as a possible storage location of the chunk in the storage medium;

reading the storage tag of the chunk in the storage medium at the suggested location and;

comparing the storage tag of the chunk at the suggested location with the access tag and indicating whether the storage tag and the access tag match;

if the storage tag of the chunk at the suggested location and the access tag match, accessing the chunk at the suggested location; and if the storage tag of the chunk at the suggested location and the access tag do not match, searching the storage medium from the suggested location to locations proximate to the suggested location to look for a match between the storage tag and the access tag and thereby locate the chunk requested by the user.

2. The method of accessing files in accordance with claim 1, wherein said searching step comprises the steps of:

reiteratively reading the storage tags associated with chunks proximate to the suggested location until a predetermined event occurs, and terminating said search upon such an occurrence.

3. The method of accessing files in accordance with claim 2 wherein said predetermined event is one of two possible events, whichever comes first, and the two possible events are locating an empty chunk and finding a match between the access tag and the storage tag.

4. The method of accessing files in accordance with claim 1 wherein said searching step comprises the step of:

reading the storage tag of each chunk in the storage medium at locations proximate to the suggested location and;

second comparing with the access tag each storage tag read at the locations proximate to the suggested location and indicating a tag match if the storage tag matches the access tag at a location proximate to the suggested location;

detecting an available-for-write chunk if said second comparing step has not indicated a tag match and the chunk is empty; and if said second comparing step has not indicated a tag match and the chunk is not empty, scanning in a preset search pattern to a next storage location and reading the storage tag of a next chunk;

repeating said second comparing step, the detecting step and the scanning step until one of said second comparing step and the detecting step indicates a tag match or an available-for-write chunk, respectively.

5. The method of claim 4 further comprises the steps of:

writing data to said available-for-write chunk, if said detecting step detects an empty chunk; and updating the storage tag of the available-for-write chunk to match the access tag.

6. The method of claim 4 when retrieving a file further comprises the step of:

returning a message to the computer system indicating the requested chunk was not found when said scanning step completes the preset search pattern and said comparing step has not indicated a tag match.

7. The method of claim 4, when writing a file, further comprises the step of:

if said comparing step indicates a tag match, indicating to said computer system a message for the user to choose between appending the file and overwriting the file.

8. In a data processing system including a computer having volatile and non-volatile memory, and input/output apparatus configured for controlling the operation of at least some of said non-volatile memory; said non-volatile memory being divided into an identifiable and selected number of bytes forming blocks of user data, and a hash code file system for said data processing system, apparatus for accessing user data blocks in the hash code file system comprising:

said hash code file system having a storage tag associated with each block of user data;

a hashing module, responsive to an access request containing an access tag identifying the user data block requested, operable to hash code at least a portion of the access tag to create a suggested address of a possible storage location for the user data block identified by the access tag;

said input/output apparatus responsive to the suggested address for detecting if a storage tag at the suggested address matches the access tag and accessing a user data block at the suggested address in said non-volatile memory if there is a match; and said input/output apparatus responsive to the suggested address for detecting if a storage tag at the suggested address does not match the access tag and searching the non-volatile memory in a preset pattern from the suggest address until a match between the access tag and a storage tag is found or an empty user data block is found.

9. The apparatus of claim 8, wherein:

said non-volatile memory is accessed first at the suggested address; and said input/output apparatus upon finding an empty user data block at the suggested address, writing a user data block if the access request is a write operation.

10. A computer program storage medium readable by a computing system and encoding a program of instructions for executing a computer process for accessing data in the computing system, said computer process comprising the steps of:

appending a tag on finite tagged portions of files to be accessed;

during an access request hashing an access tag in the access request to suggest a possible location of where said tagged portions of files reside on a computer useable medium, and;

reading a storage tag stored at the possible location and comparing the storage tag to the access tag to determine a tag match or no tag match;

if there is a tag match, accessing the tagged portion of the file at the possible location:

if there is no tag match, searching the computer usable medium in a predetermined search pattern for accessing finite portions of files on the computer useable medium.

11. The computer program storage medium of claim 10 wherein said computer process further comprises the step of terminating the search pattern on the occurrence of a predetermined event.

12. The computer program storage medium of claim 11 wherein said predetermined event in the searching step of said computer process comprises detecting a tag match or finding an available-for-write finite portion on the computer useable medium.

13. The computer program storage medium of claim 10 wherein the access tag and the storage tag contain a pathname and offset identifying a finite portion of the file.

* * * * *